J. BRUNCKEN.
STARTING INDUCTION MOTORS.
APPLICATION FILED DEC. 2, 1920.

1,392,555.

Patented Oct. 4, 1921.

Inventor
J. Bruncken
by F. Dittmar
Attorney

UNITED STATES PATENT OFFICE.

JOHANNES BRUNCKEN, OF COLOGNE-BICKENDORF, GERMANY.

STARTING INDUCTION-MOTORS.

1,392,555.      Specification of Letters Patent.      Patented Oct. 4, 1921.

Original application filed January 13, 1920, Serial No. 351,240. Divided and this application filed December 2, 1920. Serial No. 427,835.

*To all whom it may concern:*

Be it known that I, JOHANNES BRUNCKEN, citizen of Germany, residing at Cologne-Bickendorf, have invented certain new and useful Improvements in Starting Induction-Motors, (for which I have filed an application in Germany, July 17, 1919,) of which the following is a specification, reference being had therein to the accompanying drawing.

This invention relates to improvements in the method of starting induction motors described and claimed in my application Serial No. 351,240, filed January 13, 1920, and the present application is a division thereof.

Figure 1:
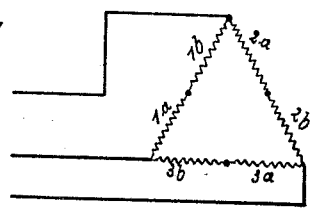
Figure 2:
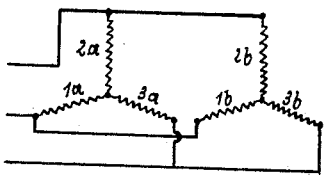
Figure 3:
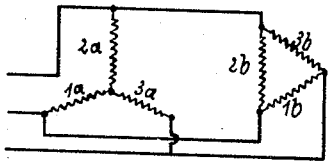
Figure 4:
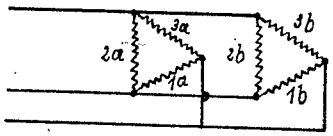
Figure 5:
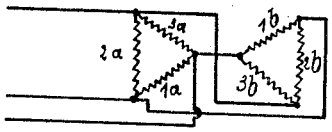

The invention is clearly illustrated in the accompanying drawings, in which Figures 1 to 5 are diagrammatic views of various forms of the invention.

Most power stations require that three phase motors connected to the net-work they supply should be designed for two voltages. The most important voltages are 220 volts for mesh connection and 380 volts for star connections of the motor. It is also very desirable from the manufacturer's point of view if machines can be designed for either of two voltages.

Now a double induction motor constructed for starting in the manner described may, according to this invention, be utilized for either of two voltages, which, as a rule, are in the ratio of $\sqrt{3}$ to 1. For instance, if such a double motor is designed for 380 volts and to be started in the manner described, the same motor may also be employed upon a supply of 220 volts and be started in the manner described hereinafter.

The various stages in starting the motor are illustrated in the accompanying drawing in the same manner as in our original patent application, 1, 2 and 3 indicating the three phases, and $a$ and $b$ the two stator windings.

In the 1st stage the two stator windings are connected in series in mesh; in the 2nd they are connected in parallel in star; in the 3rd they are connected in parallel, one in star and one in mesh; in the 4th they are connected in parallel both in mesh; in the 5th they are again connected in parallel in mesh but the one field is shifted through 180° relatively to the other.

Having now particularly described and ascertained the nature of my said invention and in what manner the same is to be performed, I declare that what I claim is:

The method of starting an induction motor having two separate sets of primary windings, which consists in successively connecting said windings in series in mesh, in parallel in star, in parallel one in star and one in mesh, in parallel in mesh, and finally shifting the field produced by one winding relatively to the field produced by the other through 180°.

In testimony whereof I affix my signature in the presence of two witnesses.

JOHANNES BRUNCKEN.

Witnesses:
    AUG. BAUER,
    JEN BLUMEME.